Oct. 2, 1934.    L. BERTELE    1,975,677
OBJECTIVE
Filed Feb. 13, 1933
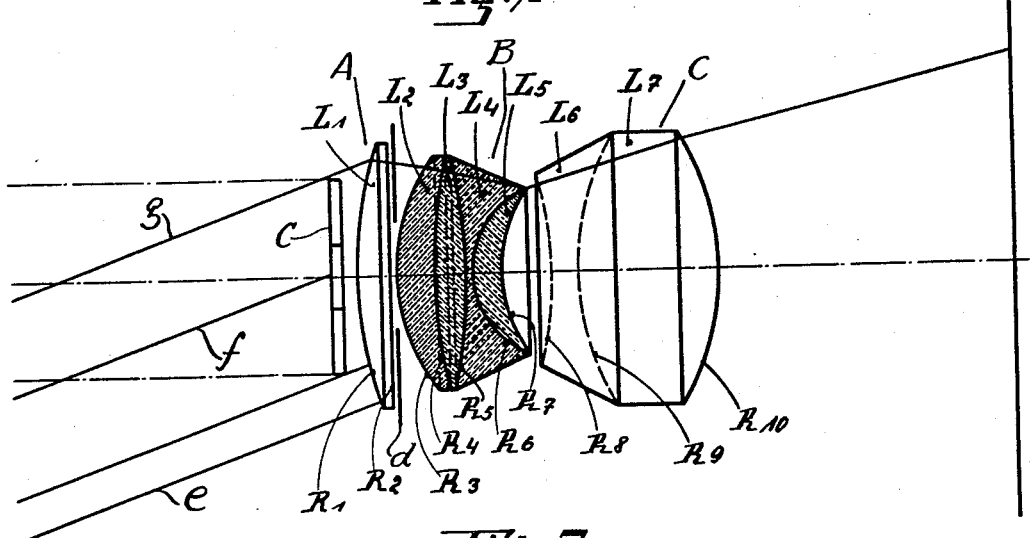
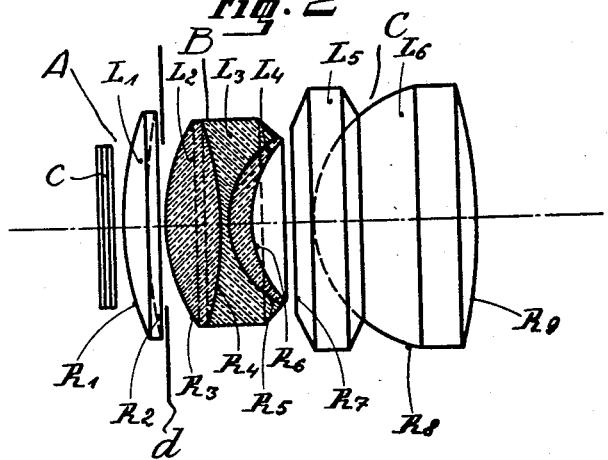
Inventor:
L. Bertele
by:

Patented Oct. 2, 1934

1,975,677

UNITED STATES PATENT OFFICE 1,975,677

OBJECTIVE

Ludwig Bertele, Dresden, Germany, assignor to Zeiss Ikon, Aktiengesellschaft Dresden, Dresden, Germany Application February 13, 1933, Serial No. 656,440
In Germany February 17, 1932

4 Claims. (Cl. 88—57)

This invention relates to objectives having a large opening and a large image angle; the known objectives of this type suffer from comatic aberrations; it is the object of the present invention to do away with this drawback.

I am aware of the objective shown and described in the German Patent No. 530,843 and permitting to obtain a strong intensity of light at greatest correction. If this objective is to be used for color film exposures with the employment of lens rastrum films difficulties are encountered in that such an objective must deliver images, at a large aperture, without blending down. Hitherto it has been customary to design objectives with large image angle in such a manner that a continual decrease of the light in the direction to the rims took place. The amount of light was thereby reduced to one half or even to one third, but this disadvantage was consciously taken into the bargain, as with exposures made with normally illuminated objects the decrease of the luminosity is scarcely ocularly perceptible and a good rim sharpness could be attained also with objectives of simple design.

With color film exposures the three-color filter must be attached to any place of the objective. As one desires to make also black-white exposures with such an objective, it must be possible to insert the filter into the image-producing system in the simplest manner. The filter will preferably be arranged in front of the objective. In both cases it is, however, in order to obtain an unobjectionable exposure, necessary that all pencils of rays taking part in the production of the image penetrate all three color parts of the film, irrespective of the angle under which they enter into the objective.

If the filter is placed in front of the objective one is compelled to increase considerably the diameter of the rear lens of the objective in order to prevent the cutting-off of individual part colors of the filter. There is attained by this contrivance, it is true, that all oblique pencils of rays can pass through the objective, but they suffer from extremely strong comatic aberrations so that such objectives cannot possibly be employed.

Various methods have been used to do away with this comatic fault. Thus, for instance, a collecting cemented surface has been inserted into the rear lens in order to compensate the strong comatic aberration. Thorough investigations have disclosed, however, the fact that said aberrations can be obviated only on definite angle inclination; for smaller angles there remains a comatic fault in the sense of a strong supercorrection and for larger angles of incidence there remains a comatic fault in the sense of a strong undercorrection so that that method did not present a satisfying solution of the problem.

Extended investigations made with the objective shown and described in the above-mentioned German Patent 530,843 have disclosed the fact that the place where the grave comatic faults originate is in the strongly concave and thus dispersing acting surface which is in contact with the air and is bent through in the direction to the front lens.

Concerning now the present invention, this consists therein that in front of said strongly concave surface is inserted a still stronger curved cemented surface which has collecting refractive power at a relatively slight difference of exponents. This cemented surface must likewise be strongly curved in the direction to the front lens and must lie as near as possible to that surface where the coma arises.

Investigations made with the said German objective have disclosed the possibility to obviate completely the coma for the obliquely entering pencils of light which penetrate the objective at the outer zone.

The invention is illustrated diagrammatically and by way of example on the accompanying drawing on which Figure 1 is partly a side-view of, and partly an axial section through, an objective designed according to this invention, and Figure 2 is a similar representation showing a modification.

In both figures the sets of lenses constituting the objective consists of three components A, B and C. The components A and C are shown in side-view, the component B is shown in axial section. Each component is on both sides in contact with the air, and in each figure the components A and C have positive refraction. The invention proper resides in the component B, by reason of which the components A and C are not described in detail.

In Fig. 1 the component B is formed of the convexo-concave lens $L^2$, the biconvex lens $L^3$, the biconcave lens $L^4$ and the meniscus lens $L^5$. $R^3$ denotes the convex face of the lens $L^2$; $R^4$ is the cemented surface between the lenses $L^2$ and $L^3$; $R^5$ is the cemented surface between the lenses $L^3$ and $L^4$; $R^6$ is the cemented surface between the lenses $L^4$ and $L^5$; and $R^7$ is the concave face of the lens $L^5$. In Fig. 2 the component B is formed of the biconvex lens $L^2$, the biconcave lens $L^3$ and the meniscus lens $L^4$. The free faces of the lenses ($L^2$ and $L^4$) and cemented surfaces of all three lenses of the component B are the same as in Fig. 1, with the exception of the letter $R^4$, as there is no separate lens $R^4$ in Fig. 2, in that the lenses $L^2$ and $L^3$ of Fig. 1 are united with one another in Fig. 2 and form the biconvex lens $L^2$. The lenses $L^3$ and $L^4$ are the same in both figures. $c$ denotes in both figures the filter and $d$ the diaphragm.

Originally, it is with black-white exposures sufficient to bind the obliquely entering pencils by the rays $r$ and $f$ (Fig. 1). In the case of making color films the oblique pencil must be bounded in upward direction by the ray $g$.

For the rest, I refer to the following two examples, of which the first relates to Fig. 1 and the second to Fig. 2.

FIRST EXAMPLE

*Aperture ratio 1:2—F=48.7 mm.*

| Radius | Thickness | $n_d$ | $v$ |
|---|---|---|---|
| $R_1$+40.00 | 3.0 | 1.6185 | 60.5 |
| $R_2$ Air | 1.0 | | |
| $R_3$+18.0 | 3.5 | 1.6711 | 47.5 |
| $R_4$+60.0 | 2.5 | 1.4645 | 65.5 |
| $R_5$—100.0 | 0.8 | 1.6890 | 31.2 |
| $R_6$+8.4 | 2.5 | 1.7174 | 29.5 |
| $R_7$+12.5 Air | 4.0 | | |
| $R_8$—60.0 | 2.0 | 1.6711 | 47.5 |
| $R_9$+23.0 | 13.0 | 1.4645 | 65.5 |
| $R_{10}$—38.12 | | | |

SECOND EXAMPLE

*Aperture ratio 1:2.5—F=5 cm.*

| Radius | Thickness | $n_d$ | $v$ |
|---|---|---|---|
| $R_1$+28.20 | 2.5 | 1.6228 | 56.9 |
| $R_2$+117.42 | 1.5 | | |
| $R_3$+17.97 | 5.3 | 1.5647 | 55.8 |
| $R_4$—35.08 | 0.9 | 1.6398 | 34.6 |
| $R_5$+8.95 | 2.2 | 1.7783 | 26.5 |
| $R_6$+11.35 | 3.8 | | |
| $R_7$—∞ | 2.0 | 1.5614 | 45.3 |
| $R_8$+13.28 | 15.5 | 1.6396 | 48.3 |
| $R_9$—55.90 | | | |

Filter 2 mm. in front of $R_1$; filter $\phi$ 14.8×14.8 mm. diaphragm immediately behind $R_2$.

I claim:

1. An objective, comprising, in combination, three components formed by lenses and being each on both sides in contact with the air, the first and the third component having positive refraction and the middle component comprising contacting lens elements having as one of the lenses that are in contact with the air a collecting lens directed towards the object, a dispersing lens and as the other lens which is in contact with the air a meniscus lens, the convex surface of which is directed towards said collecting lens, and the cemented surface of which has a shorter radius of curvature than the said collecting lens.

2. An objective, comprising, in combination, three components formed by lenses and being each on both sides in contact with the air, the first and the third component having positive refraction and the middle component comprising contacting lens elements having as one of the lenses that are in contact with the air a collecting lens directed towards the object, a dispersing lens and as the other lens in contact with the air a meniscus lens, the convex surface of which is adjacent the dispersing lens and directed towards said collecting lens, and the cemented surface of which has a shorter radius of curvature than the said collecting lens.

3. An objective, comprising, in combination, three components formed by lenses and being each on both sides in contact with the air, the first and the third component having positive refraction and the middle component comprising contacting lens elements having as one of the lenses that are in contact with the air a collecting lens directed towards the object, a dispersing lens and as the other lens which is in contact with the air a meniscus lens, the convex surface of which is directed towards said collecting lens, and the cemented surface of which has a shorter radius of curvature than the said collecting lens.

4. An objective, comprising, in combination, three components formed by lenses and being each on both sides in contact with the air, the first and the third component having positive refraction and the middle component comprising contacting lens elements having as one of the lenses that are in contact with the air a collecting lens directed towards the object, a dispersing lens and as the other lens which is in contact with the air a meniscus lens, the convex surface of which is adjacent the dispersing lens and directed towards said collecting lens, and the cemented surface of which has a shorter radius of curvature than the said collecting lens.

LUDWIG BERTELE.